United States Patent [19]

Kimata et al.

[11] Patent Number: 4,863,417
[45] Date of Patent: Sep. 5, 1989

[54] AUTO-TENSIONER FOR BELT

[75] Inventors: Kei Kimata, Aichi; Ken Yamamoto, Shizuoka; Makoto Yasui; Katsumi Furutani, both of Iwata, all of Japan

[73] Assignee: NTN Toyo Bearing Co., Ltd., Osaka, Japan

[21] Appl. No.: 241,282

[22] Filed: Sep. 7, 1988

[30] Foreign Application Priority Data

Sep. 8, 1987 [JP] Japan .................. 62-137018[U]
Sep. 8, 1987 [JP] Japan .................. 62-137019[U]
Jun. 15, 1988 [JP] Japan .................. 63-79040[U]

[51] Int. Cl.4 ............................................. F16H 7/08
[52] U.S. Cl. .................... 474/101; 474/111; 474/138
[58] Field of Search ............... 474/101, 109, 111, 136, 474/138, 133, 135

[56] References Cited

U.S. PATENT DOCUMENTS 4,425,104  1/1984  Ojima ................................. 474/111
4,472,161  9/1984  Ojima ............................. 474/138 X
4,702,726 10/1987  Ojima et al. ..................... 474/138 X
4,708,696 11/1987  Kimura et al. ................... 474/138 X Primary Examiner—Thuy M. Bui
Attorney, Agent, or Firm—Armstrong, Nikaido, Marmelstein, Kubovcik & Murray

[57] ABSTRACT

An auto-tensioner for a belt has a cylindrical body having a bottom. A nut formed with female threads on its inner periphery and having a rod integrally formed at one end is slidably mounted in the body. A bolt is mounted in the body so that its male threads will engage the female threads on the nut. A belt loading spring is mounted between the nut and the bottom of the body to urge the nut in such a direction as to increase the tension to the belt. A bolt turning spring is mounted between the nut and the bolt to urge and turn the bolt in such a direction as to be pressed against the bottom of the body or in a direction away from the nut. Thus the nut and the bolt are moved either toward or away from each other according to the load from the belt which acts on the rod so as to automatically adjust the tension to the belt.

3 Claims, 3 Drawing Sheets

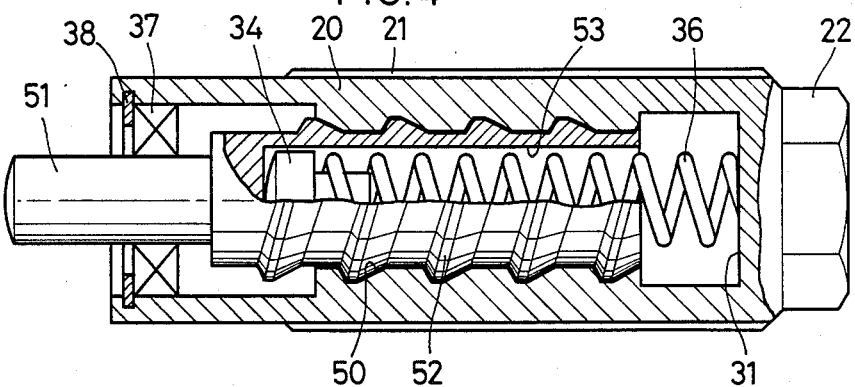
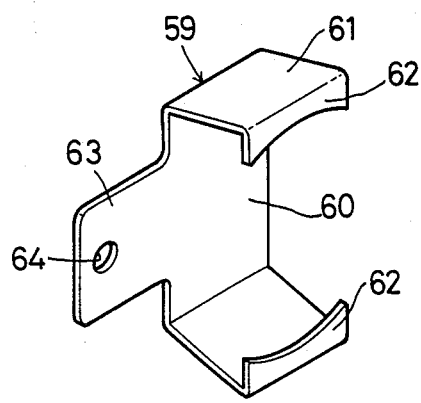
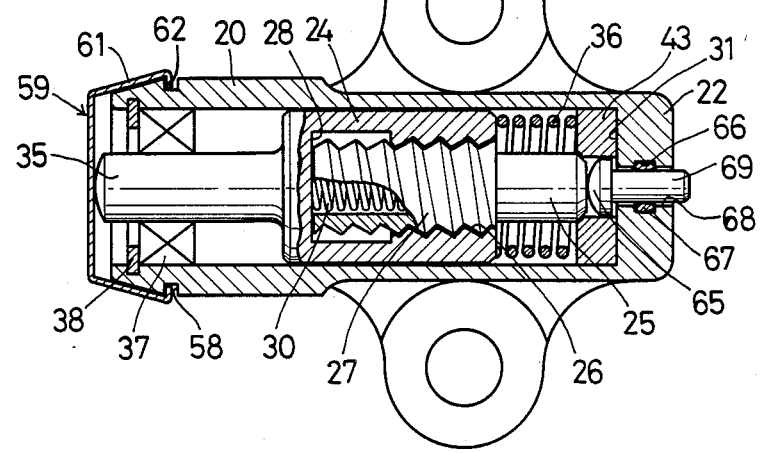

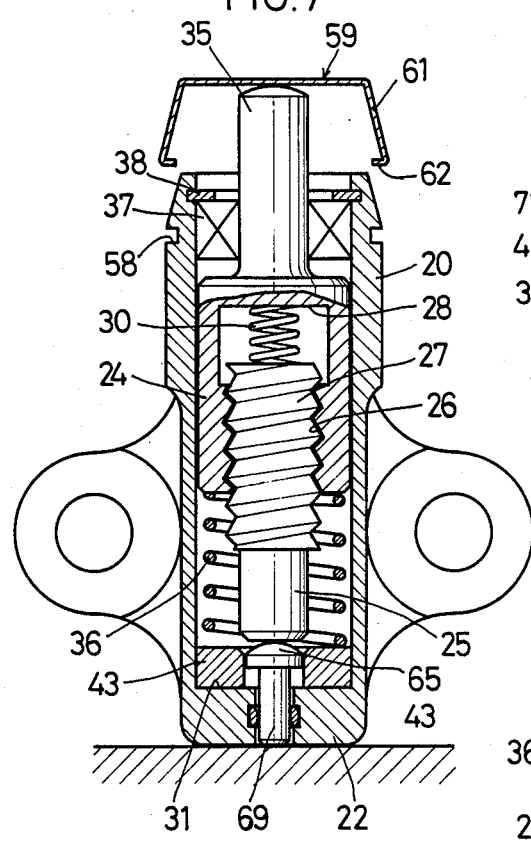
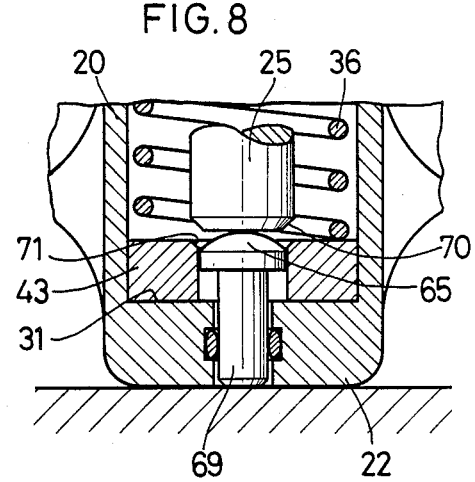
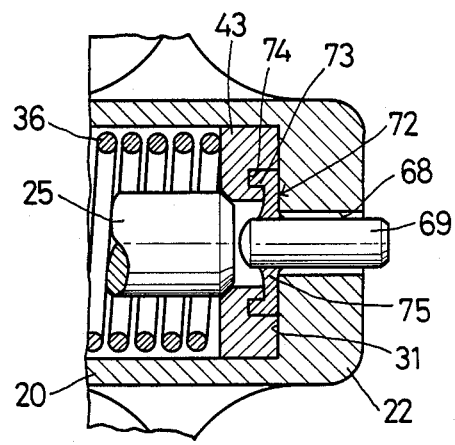
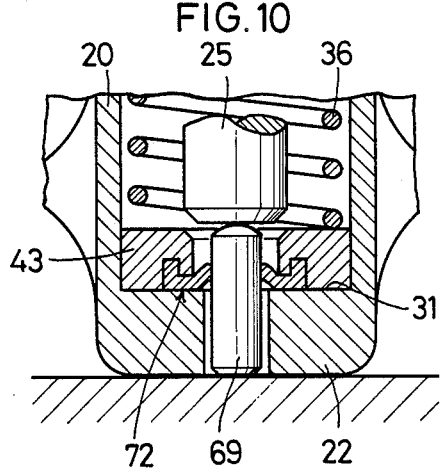

AUTO-TENSIONER FOR BELT

The present invention relates to an auto-tensioner for a power transmission belt for use with an engine, more specifically an auto-tensioner for adjusting the tension of a toothed timing belt used to transmit the rotation of a crank shank of an engine in an automobile.

BACKGROUND OF THE INVENTION

Japanese Patent Unexamined Publication No. 59-20825 discloses a prior art auto-tensioner (shown in FIG. 12 generally at A) which has an idler pulley 4 and is adapted to adjust the tension of a toothed timing belt 3 put around a pulley 2 of a crank shaft 1 mounted on an automobile engine E and a cam shaft pulley (not shown). This autotensioner A is of a hydraulic type and comprises a housing 5, a cylinder 6 mounted in the housing and a plunger 7 slidably mounted in the cylinder. The cylinder 6 and the plunger 7 define a hydraulic chamber 8 in which a check valve 9 and a spring 10 are mounted. A bellows 11 seals oil in the chamber 8. The timing belt 3 is automatically tension-controlled by the auto-tensioner. This prior art auto-tensioner is hydraulically operated and requires many parts and has to be accurately assembled. It is also expensive and troublesome to assemble.

An object of the present invention is to provide an auto-tensioner for belt which obviates the abovesaid shortcomings.

SUMMARY OF THE INVENTION

In accordance with the present invention, there is provided an auto-tensioner for belt comprising: a cylindrical body having a bottom; a nut mounted in the body so as to be axially slidable and formed with female threads and having a rod integrally formed at one end thereof; a bolt formed with male threads adapted to engage the female threads formed in the nut, the bolt being adapted to butt the bottom of the body; a belt loading spring mounted between the nut and the bottom of the body for urging the nut in such a direction as to increase the tension to the belt to keep constant the tension to the belt; and a bolt turning spring mounted between the nut and the bolt for urging and turning the bolt in a direction away from the nut; the nut and the bolt engaging together to bear the load from the belt acting on the rod of the nut to adjust the tension to the belt.

With the auto-tensioner of the present invention, the number of parts is small and it consists of rather simple machine parts. It can be readily mass-produced. The bolt engages the nut integral with the rod so as to move relative to each other. The belt tension is thus automatically adjusted to a suitable level determined by the length of the nut-bolt assembly.

BRIEF DESCRIPTION OF THE DRAWING

Other features and objects of the present invention will become apparent from the following description taken with reference to the accompanying drawings, in which:

FIG. 4 is a sectional view or the third embodiment;

FIG. 5 is a perspective view of the stopper;

FIG. 6 is a sectional view of the fourth embodiment in which the stopper and the assembling pin are used;

FIGS. 7 and 8 are views showing how the stopper is mounted;

FIGS. 9 and 10 are sectional views of another embodiment of the assembling pin;

DESCRIPTION OF THE PREFERRED EMBODIMENTS

Figure 1:
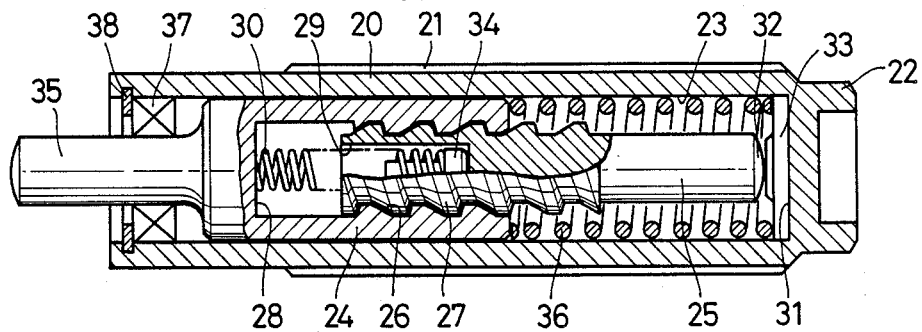
FIG. 1 is a sectional view of the first embodiment of the present invention.

FIG. 1 shows the first embodiment of the present invention which has a bottom-closed cylindrical body 20 formed on its outer periphery with a thread 21 for adjusting the mounting position. The body 20 has its closed end 22 so shaped as to be engageable with a driving tool. Further, the body 20 is formed with an axial cylindrical bore 23 in which a nut 24 and a bolt 25 are mounted. The nut 24 is mounted in the bore 23 with such a gap left therebetween as to be slidable in the axial direction. The nut is formed in its inner periphery with a serrated female thread 26 which engages a male thread 27 formed on the outer periphery of the bolt 25.

A bolt turning spring 30 is mounted between the bottom of a bore 28 in the nut and the bottom of a bore 29 formed in the bolt 25 so as to bias and turn the bolt toward an inner bottom 31 of the body 20. A seat 33 is mounted in the body 20 to receive one end 32 of the bolt 25. A semispherical nipple 34 may be mounted in the bore 29 of the bolt 25 to receive the spring 30 and allow the bolt 25 to be turned smoothly. The nut 24 is integrally formed at one end with a rod 35 and has the other end in abutment with a belt loading spring 36.

A lubricating oil is sealed in the bore 23 of the body 20 to lubricate the surfaces between the nut 24 and the body 20 and between the female thread 26 and the male thread 27. An oil seal 37 is fitted at the opening o the body 20 to prevent the lubricating oil from leaking out and prevent dust from invading into the bore 23.

Figure 2:
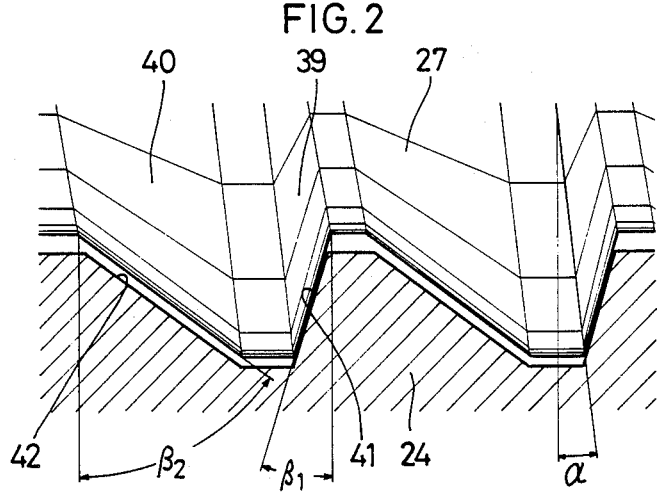
FIG. 2 is an enlarged view of the threaded portion of the same.

As shown in FIG. 2, the male thread 27 on the bolt 25 has a rather large lead angle $\alpha$ and has its lower flank 39 and upper flank 40 asymmetrically arranged. Namely the upper flank angle $\beta_2$ is larger than the lower flank angle $\beta_1$. The female thread 26 on the nut 24 has a lower flank 41 and upper flank 42 complementary in sectional shape to the lower flank 39 and the upper flank 40 of the male thread 27, respectively.

The nut 24 is normally urged by the belt loading spring 36 in such a direction as to increase the tension of a belt (not shown). Thus, if the belt slackens, the nut 24 will be moved to the lefthand side of FIG. 1 to bring its female thread 26 into contact with the male thread 27 on the bolt 25 between their lower flanks 41 and 39. The bolt 25 is thus moved to the lefthand side together with the nut 24, getting clear of the seat 33. The moment the bolt 25 clears the seat 33, it is urged and turned by the bolt turning spring 30 to be brought into contact with the seat 33 again.

Since the lower flank angle $\beta_1$ is set small, the friction between the lower flanks 41 and 39 are small. Thus, the bolt 25 can be quickly turned by the bolt turning spring 30. The rather large lead angle $\alpha$ of the threads also contributes to a quick turning of the bolt 25. On the other hand, the nut 24 is pushed by the belt loading spring 36 to the point where the bias of the spring 36 balances with the tension of the belt. The belt tension is thus automatically kept constant.

If the belt tension grows too large, the nut 24 will be pushed by the belt to the righthand side of FIG. 1 to bring its female thread 26 into contact with the male thread 27 on the bolt 25 between the upper flanks 40 and 42 having a rather large flank angle.

The bolt 25 are turned with respect to the nut 24 under a variable load from the belt against the frictional force between the upper flanks 40 and 42 in such a direction that the nut 24 will be retracted into the body 20. The abovesaid frictional force depends on the variable load from the belt and the bolt 25 stops turning when the frictional force grows too large. Thus, the relative movement between the nut 24 and the bolt 25 continues intermittently until the belt tension balances with the bias of the belt loading spring 36. The belt tension is thus automatically set to a predetermined value.

Figure 3:
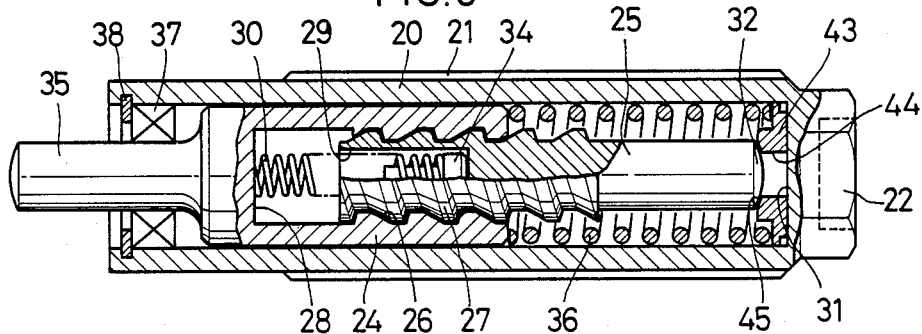
FIG. 3 is a sectional view of the second embodiment.

FIG. 3 shows the second embodiment in which like or same parts are represented by like numerals. On the inner bottom surface 31 of the body 20, seat 43 formed with a center bore 44 is mounted. The bore has its edge 45 tapered to snugly receive the convexed end 32 of the bolt 25 at its peripheral edge. The arrangement will make it possible, merely by changing the diameter and shape of the tapered edge 45, to readily adjust the frictional resistance between the tapered edge 45 and the convexed end 32 which is produced when the bolt 25 is pressed against the seat 43. Thus, the frictional resistance can be adjusted to minimize the high-frequency displacement of the nut 24 irrespective of variable load values from the belt which differ with different kinds of engine.

FIG. 4 shows the third embodiment of the auto-tensioner having a bottom-closed cylindrical body 20 formed on its outer periphery with a thread 21 for fixing the body 20 in an adjustable position and formed on its inner periphery with a serrated female thread 50. In the body 20, a rod 51 is mounted and formed with its serrated male thread 52 which is adapted to engage the female thread 50 in the body 20. The rod 51 is formed with a recess 53 in which the belt loading spring 36 is mounted to adjust the tension of a belt (not shown). The spring 36 has its one end bearing on an inner end 22 of the body 20 and has its other end supported on the bottom of the recess 53 in the rod 51 through a semispherical nipple 34 so as to normally bias the rod 51 in a belt-tensioning direction. The rod 51 is turned under the bias of the spring 36 to protrude from the body 20 until the belt tension balances with the bias of the spring 36. The body 20 is filled with a lubricating oil which serves to lubricate the surfaces between the female thread 50 and the male thread 52. An oil seal 37 is provided to prevent the oil from leaking out. The third embodiment is substantially the same in operation as the first embodiment.

As shown in FIG. 6, the body 20 may have its open end tapered and covered with a stopper 59 to prevent the nut 24 from slipping out of the body. The body is formed in its outer periphery near its open end with an annular groove 58 to engage an inturned flange portion 62 of the stopper 59. As shown in FIG. 5, the stopper 59 is made by pressing a steel plate into a ⊐-shape in section. It has a flat bottom portion 60 adapted to abut the rod 35 of the nut 24 and has its both wing portions 61 tapered so as to conform to the shape of the outer periphery of the end of the body 20. The wing portions 61 have their edge portion further bent inwardly to form the flanges 62. The flanges have arcuate edge lines so as to be snugly engaged in the annular groove 58 without any play. The bottom portion 60 is integrally provided with a protrusion 63 in which is formed a hole 64. A tool for disengaging the stopper 59 can be inserted in the hole 64.

As shown in FIG. 6, the body 20 has its bottom 22 formed with a hole 68 having a diameter smaller than the inner diameter of the cylindrical seat 43. In the hole 68, a pin 69 is mounted which is provided with a collar 65 having its top convexed. The collar 65 serves to stop the pin 69 from slipping out of the body 20. The pin 69 has its outer end slightly projecting from the body 20. In the periphery of the hole 68, an annular groove 66 is formed in which a seal ring 67 is fitted. Alternatively, the pin 69 may be formed in its outer periphery with an annular groove and a seal ring may be fitted therein.

Next we shall describe how the stopper 59 is fitted to the body 20 with reference to FIGS. 7 and 8. Firstly, the stopper 59 is placed on the rod 35 of the nut 24 which is now in a fully projecting position under the bias of the belt loading spring 36. In this state, the bolt 25 is pressed against the cylindrical seat 43 biased by the bolt turning spring 30. Then the belt auto-tensioner is placed on a base of a press so that the pin 69 will be withdrawn into the body 20 to push up the bolt 25 by a length equal to the length of the projecting portion of the pin 69. The auto-tensioner is then intermittently pressed by the press.

In this state, the tapered surface 70 on the bolt 25 is kept apart from the tapered surface 71 on the seat 43 (FIG. 8) and the bolt 25 is in contact with the semispherically convexed collar 65 at one point. The bolt 25 can thus be turned freely with little frictional resistance in such a direction as to withdraw the nut 24 into the body 20.

As the nut 24 is drawn into the body, the stopper 59 slides down over the outer periphery on the body 20 while spreading its wing portions 61 until their flange portions 62 engage in the annular groove 58 where the wing portions 61 are allowed to resiliently return to their original state (FIG. 6).

The press is then disengaged from the auto-tensioner to allow the bolt 25 to be turned by the spring 30 and pressed against the cylindrical seat 43 again. The nut 24 is urged by the belt loading spring 36 to give tension to the belt.

In the embodiment shown in FIGS. 9 and 10, another type of pin 69 having its inner end semi-spherically convexed extends through the hole 68 and the cylindrical seat 43. A circular seal member 72 is vulcanizedly welded to the pin 69 not only to prevent the leakage of the oil in the body 20 but also to prevent the pin 69 from slipping out of the body 20. The seal member 72 is provided at its outer edge with an annular flange 73 engaged in an annular groove 74 formed in the bottom of the cylindrical seat 43. The seal member 72 is thus pressed tightly in position between the bottom of the seat 43 and the inner end of the body 20.

The seal member 72 is made of a flexible material so that its neck portion 75 can follow the sliding movement of the pin 69. As shown in FIG. 9, the pin 69 has its outer end slightly protruding from the bottom of the body 20 when the stopper 59 is fitted on the body 20. To fit the stopper 59 on the body, the auto-tensioner is firstly placed on a base of a press. The pin 69 is thus withdrawn into the body to abut against the bolt 25 at its convexed end and push it up away from the seat 43. (FIG. 10) The bolt 25 is now free to turn. Then the nut 24 is pushed into the body by the press until the stopper 59 is fitted in position.

Although the pins 69 shown in the embodiments have their inner end semi-spherically shaped while the bolt 25 has a flat contact surface, the bolt may have its contact surface semi-spherically shaped while the pins 69 have a flat contact surface.

This arrangement eliminates the need for a special tool for separating the bolt from the cylindrical seat. The auto-tensioner can be assembled easily merely by placing the stopper on the rod and pressing the auto-tensioner by a press. Further, the provision of the seal member on the pin eliminates the necessity of a seal bolt and a threaded hole therefor. This will lead to a reduction in cost.

The nut 24 and the bolt 25 tend to get worn at their contact surface with use. The coefficient of friction decreases with the progression of wear. Also, wear debris on the wear surfaces decreases the coefficient of friction. The smaller the frictional resistance, the more difficult it becomes to support the variable load by a frictional force. Thus, the nut 24 and a tension pulley (not shown) will displace with a large amplitude. This will in turn amplify the vibration of the belt, thus reducing its service life. Further, such an increase in the vibration of the belt will bring about much noise and can cause the valve timing to shift.

In order to cope with this problem, the present inventors made the nut 24 and the bolt 25 of hardened martensitic stainless steel.

Figure 11:
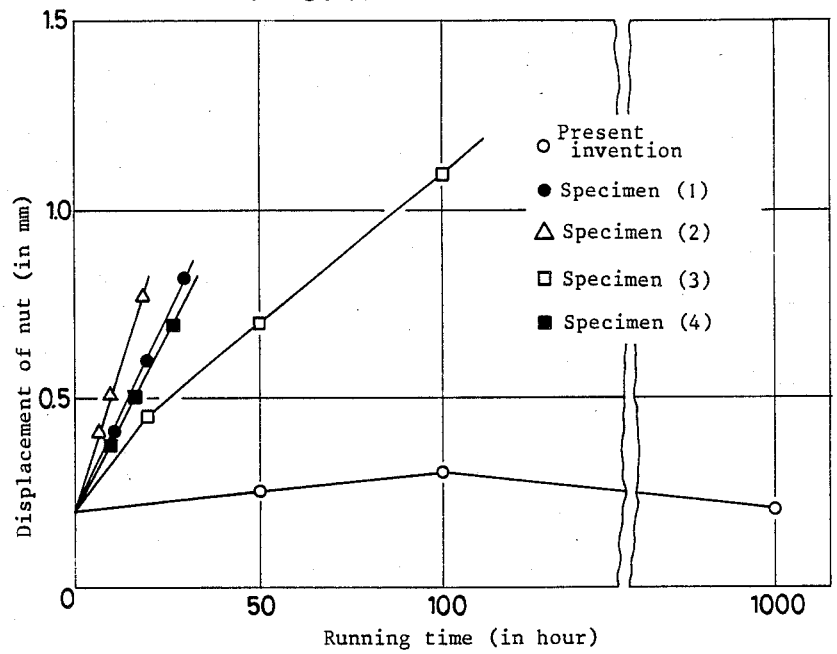
FIG. 11 is a graph showing the results of the comparison test for the wear resistance of specimens made of various kinds of materials.
Figure 12:
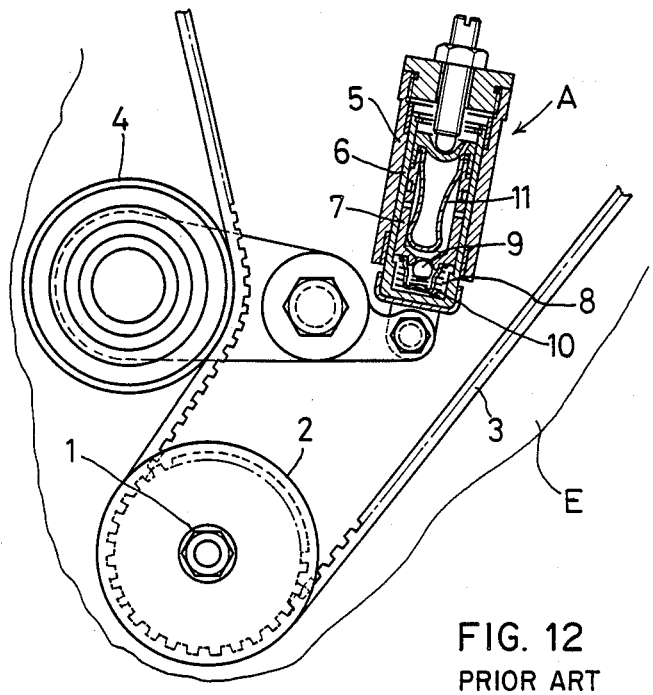
FIG. 12 is a sectional view of a prior art belt auto-tensioner.

FIG. 11 shows the results of a comparison test in which the specimen according to the present invention was compared with other specimens in wear resistance.

According to the present invention, the nut and the bolt were made of hardened SUS 440C stainless steel. For comparison, the following specimens were prepared:
(1) with the threads electrolessly nickel plated:
(2) made of carburized SCM 415 steel:
(3) made of hardened SUJ2 steel,
(4) made of SUJ2 and SCM 415 steels.

It is believed that electroless nickel plating gives a sufficiently high hardness and will not develop pores because it is a chemical plating, and further gives the surface an extremely stable coefficient of friction. But, the comparison test revealed that the nut and the bolt of the auto-tensioner plated by this process can easily develop fretting corrosion on their contact surfaces due to large variable load and high frequency of vibrations. It was also observed that powdered wear debris produced tends to further quicken wear. the comparison specimens (2) to (4) were made by hardening such materials as cemented steel or bearing steel which are usually employed for races of a rolling bearing. It was observed that wear progresses rapidly with time and the displacement of the nut grows with time as well. It was also found that the powdered debris produced as a result of fretting corrosion is composed of a FeO family compound produced by mechano-chemical reaction. Thus is required that the nut and the bolt not only have a mechanical strength but also are chemically stable. The increase in the displacement of the nut is attributable to the fact that wear on the contact surface and the presence of powdered wear debris decrease the coefficient of friction until the nut fails to support the variable load from the belt by the frictional force.

In contrast, with the specimen according to the present invention, contact surfaces on the threads scarcely wore and little wear debris was produced. It was also found that the coefficient of friction changed little even after long use. Thus, the bolt and the nut made of such a material can stably support the variable load from the belt by the frictional force.

What is claimed is:
1. An auto-tensioner for belt comprising:
a cylindrical body having a bottom;
a nut mounted in said body so as to be axially slidable and formed with female threads and having a rod integrally formed at one end thereof;
a bolt formed with male threads adapted to engage said female threads formed in said nut, said bolt being adapted to butt the bottom of said body;
a belt loading spring mounted between said nut and the bottom of said body for urging said nut in such a direction as to increase the tension to the belt to keep constant the tension to the belt; and
a bolt turning spring mounted between said nut and said bolt for urging and turning said bolt in a direction away from said nut;
said nut and said bolt engaging together to bear the load from the belt acting on said rod of said nut to adjust the tension to the belt.

2. An auto-tensioner for belt as claimed in claim 1, wherein said nut and said bolt are made of hardened maltensitic stainless steel.

3. An auto-tensioner for belt as claimed in claim 1, wherein the male threads on said bolt and the female threads on said nut are both serrated.

* * * * *